Patented July 3, 1928.

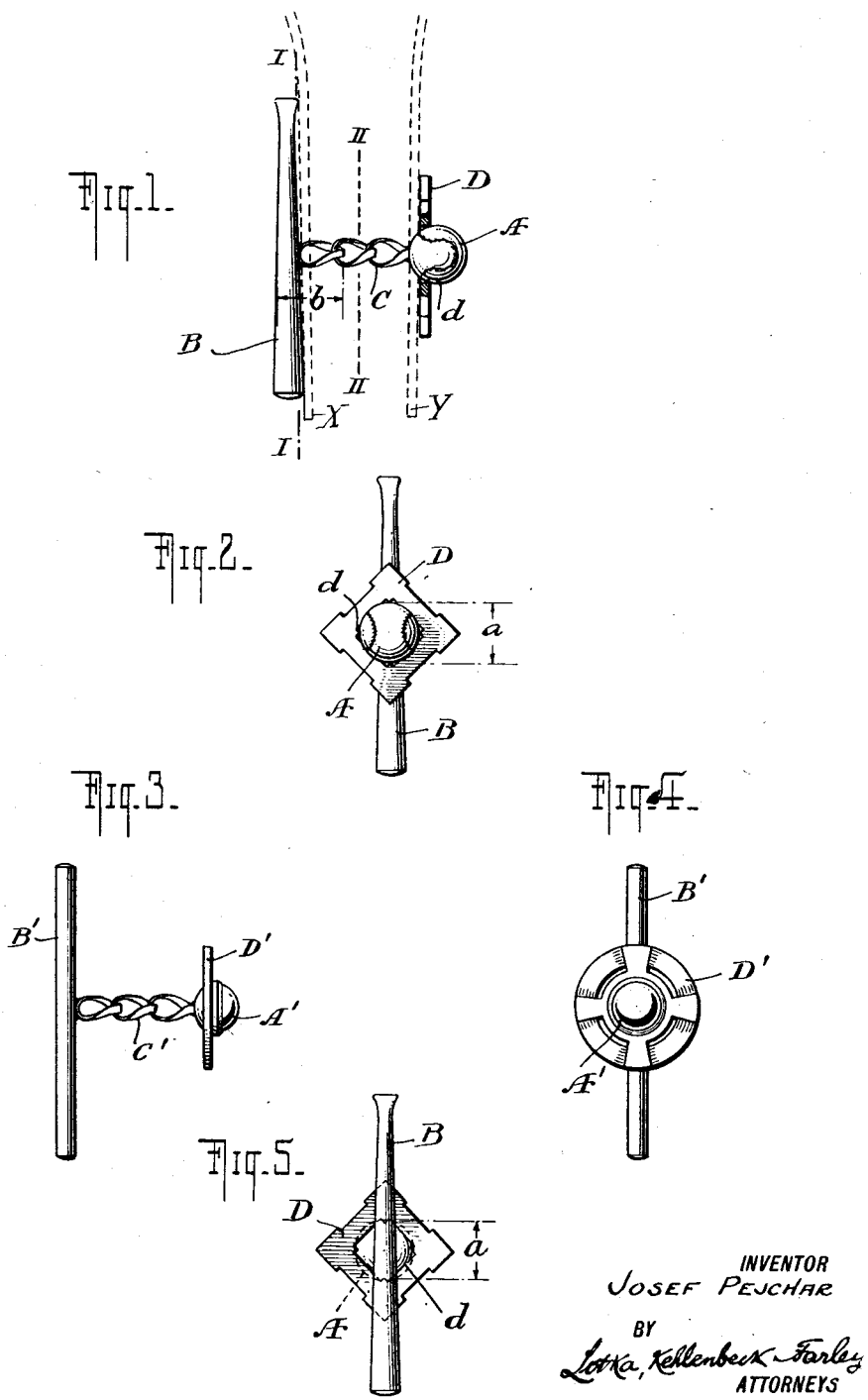

1,675,379

UNITED STATES PATENT OFFICE.

JOSEF PEJCHAR, OF BROOKLYN, NEW YORK.

CUFF LINK.

Application filed December 4, 1926. Serial No. 152,550.

My present invention has for its object to provide a cuff link of novel construction enabling it to be used in different ways and providing special facilities for the ornamentation of certain parts of the cuff link. For this purpose, I make the cuff link with an auxiliary member mounted loosely, so as to be movable longitudinally, on the connecting member which extends from one of the end members or heads of the cuff link to the other.

Two typical and satisfactory embodiments of this invention are illustrated by the accompanying drawings, in which Fig. 1 is a side view of one form of my improved cuff link; Fig. 2 is an end view thereof; Figs. 3 and 4 are views corresponding to Figs. 1 and 2 respectively and showing another form of the invention, and Fig. 5 is an end view of link shown in Figs. 1 and 2, looking in the direction opposite to Fig. 2.

In Figs. 1, 2 and 5 the end members or heads A, B of the cuff link are shown as representing, respectively, a baseball and a baseball bat, and the connecting member C consists of a chain. On this connecting member is mounted loosely the auxiliary member D, here representing a baseball diamond. The central aperture $d$ of the auxiliary member enables it to be moved freely lengthwise of the connecting member C and also to be turned about the longitudinal axis of said connecting member. Preferably the parts are properly proportioned to prevent their separation, for which purpose the head A is shown made of such a diameter that it cannot pass through the aperture $d$. As to the head B and the connecting member or chain C, their relative dimensions and arrangement are such as to make it impossible to pass the member D over such head B. In the specific embodiment illustrated, the head B is soldered to the corresponding end link of the chain C, so as to be rigid therewith, and the greatest dimension (diagonal $a$) of the aperture $d$ is smaller than the dimension $b$ indicated in Fig. 1, this dimension being equal to the length of said end link plus the thickness of the head B at the connecting point. Of course, the member D is placed on the connecting member C before the final connections are made in assembling the parts of the improved cuff link.

In the construction illustrated by Figs. 3 and 4, the auxiliary member D' is given the shape of an ornamented wheel or circlet, and the shape of the heads A', B' and of the connecting member C' is somewhat different from that of the parts A, B, C, but the general arrangement and the advantages are the same as in the form of my invention first described.

The auxiliary member D or D' increases the ornamental appearance of the article. Having this member loose (instead of, for instance, soldering it to one of the heads) enables me to decorate this member with enamel or other substances which would be damaged if exposed to a soldering heat. The mobility of the auxiliary member D or D' lengthwise of the connecting member C or C' enables me to re-arrange the parts so as to obtain various effects. For instance, as shown in Fig. 1, the member D will generally be placed next to the ball head A, but if another effect is desired, this member might be shifted to lie close to the other head B, that is to say, to the position indicated by the dotted line $l$. In either of the above mentioned positions the member D or D', in addition to the varying ornamental effects produced thereby, constitutes a button-hole guard which prevents the end members from exerting tearing strains upon the button-holes of the cuffs and from being unintentionally drawn through such button-holes in cases where such end members are shaped to make this possible. Still another possibility is afforded by placing the auxiliary member approximately centrally, as indicated at H in Fig. 1, in which case said member will come between the two parts X, Y of the cuff and become practically invisible. My invention therefore provides a cuff link convertible into a plurality of different shapes or appearances, and, in the embodiments shown, gives the purchaser the advantage of really owning three different looking cuff-links in one article.

Various modifications may be made without departing from the nature of my invention as set forth in the appended claim.

I claim:

A cuff link comprising two end members of predetermined ornamental shape, a connecting member extending between and secured to said end members, and an auxiliary metallic member of predetermined form loosely mounted on said connecting member and freely movable thereon between said end members into engagement with either of them to form therewith an ornamental end member visible upon the outside of the cuff and to constitute a button hole guard for preventing the end member from exerting tearing strains upon the button hole of the cuff, said auxiliary member being further movable to an intermediate position between said end members so as to occupy a hidden position on the cuff.

In testimony whereof I have hereunto set my hand.

JOSEF PEJCHAR.